(12) United States Patent
Lu et al.

(10) Patent No.: US 7,079,547 B2
(45) Date of Patent: Jul. 18, 2006

(54) DISTRIBUTED METHOD AND APPARATUS FOR ALLOCATING A COMMUNICATION MEDIUM

(75) Inventors: Xiaolin Lu, Matawan, NJ (US); Xiaoxin Qiu, Middletown, NJ (US)

(73) Assignee: AT&T Corp., New York, NY (US)

( * ) Notice: Subject to any disclaimer, the term of this patent is extended or adjusted under 35 U.S.C. 154(b) by 779 days.

(21) Appl. No.: 10/150,110

(22) Filed: May 20, 2002

(65) Prior Publication Data

US 2002/0172219 A1    Nov. 21, 2002

Related U.S. Application Data

(63) Continuation of application No. 09/145,074, filed on Sep. 1, 1998, now Pat. No. 6,501,765.

(51) Int. Cl.
*H04L 12/66* (2006.01)
(52) U.S. Cl. .................... 370/463; 370/462; 370/461
(58) Field of Classification Search .................. None
See application file for complete search history.

(56) References Cited

U.S. PATENT DOCUMENTS

| 5,327,534 A | * | 7/1994 | Hutchison et al. .......... 709/226 |
| 5,469,439 A | | 11/1995 | Thaler et al. ............... 370/437 |
| 5,479,395 A | * | 12/1995 | Goodman et al. .......... 370/438 |
| 5,570,355 A | | 10/1996 | Dail et al. ................. 370/60.1 |
| 5,572,517 A | | 11/1996 | Safadi ........................ 370/50 |
| 5,648,958 A | | 7/1997 | Counterman ................ 370/458 |
| 5,721,735 A | | 2/1998 | Smiroldo .................... 370/442 |
| 5,878,221 A | * | 3/1999 | Szkopek et al. ............ 709/218 |
| 6,219,353 B1 | | 4/2001 | Wight et al. ................ 370/425 |

OTHER PUBLICATIONS

U.S. Appl. No. 09/047,634, filed Mar. 1998, Lu et al.
U.S. Appl. No. 09/215,851, filed Dec. 1998, Lu et al.

* cited by examiner

*Primary Examiner*—Doris H. To
*Assistant Examiner*—Thien Tran
(74) *Attorney, Agent, or Firm*—Oliff & Berridge, PLC (57) ABSTRACT

The invention provides a method and apparatus for end-users to allocate a communication medium locally without requiring a central arbitration device while guaranteeing access to the end-users. The end-users bid for control of an upstream data channel by concurrently transmitting auction data and address data on a first upstream signaling channel and a second upstream signaling channel. An end-user gains control of the upstream data channel when data received from the first and second downstream signaling channels match the auction and address bits. When it is determined that the end-user lost the bid, the end-user backs off from the first and second upstream signaling channels and refrains from bidding until the first and second upstream signaling channels become quiet.

4 Claims, 10 Drawing Sheets

DISTRIBUTED METHOD AND APPARATUS FOR ALLOCATING A COMMUNICATION MEDIUM

BACKGROUND OF THE INVENTION

1. Field of Invention

This invention relates to a distributed method and apparatus that allocates a communication medium via efficient arbitration techniques.

2. Description of Related Art

Conventionally, management of a communication medium requires either a centralized head-end to control arbitration among end-users (e.g., telephone stations or personal computers, for example) or end-users randomly competing for access. While centrally controlled arbitration may provide guaranteed access, an end-user must first arbitrate successfully before transmitting end-user information. This management scheme undesirably requires an arbitration overhead time to be added to a data transmission time as well as centralized arbitration hardware to manage the arbitration.

On the other hand, while overhead is avoided by random competition techniques such as Ethernet protocol, end-users are not guaranteed access. Thus, new technology is required to reduce overhead and guarantee access to communication mediums.

SUMMARY OF THE INVENTION

The invention provides a method and apparatus for end-users to allocate a communication medium locally without requiring a central arbitration device. The end-users are coupled together via a first upstream signaling channel, a first downstream signaling channel, a second upstream signaling channel, a second downstream signaling channel, a downstream data channel and an upstream data channel. The end-users bid for control of the upstream data channel by arbitrating on the first and second upstream signaling channels. When an end-user desires to gain control of the upstream data channel, both auction data and address data are transmitted concurrently on the first and second upstream signaling channels, respectively. When data received by the end-user from the first and second downstream signaling channels matches the auction and address data, the end-user wins the bid and gains control of the upstream data channel. However, if the data received from the first downstream signaling channels does not match the auction data, the end-user backs off from the first and second upstream signaling channels and refrains from bidding for control of the upstream data channel until the first and second upstream signaling channels become quiet. In all other cases the end-user will continue to bid.

The auction data values may be used to set priorities among the end-users. During a first few auction cycles, each of the end-users transmit auction data values according to a priority preassigned by a head-end, for example. After the first few auction cycles, only the highest priority end-users remain to bid for control of the upstream data channel. For subsequent auction cycles, the remaining end-users generate auction data values randomly to bid for control of the upstream data channel.

The auction data values and the address bits are transmitted concurrently when each of the end-users bids for control of the upstream data channel. Concurrent transmission of the auction data values and address bits increases the efficiency of the communication medium allocation process.

In addition, the end-users may also transmit data on the upstream data channel while transmitting the auction data values and address bits. For this case, the time required to transmit both the auction data values and address bits are overlapped by the data transmission so that if only one user arbitrates for control of the upstream data channel, no overhead is expended for the arbitration process. If data is transmitted on the upstream data channel in frames, bidding for control of the upstream data channel may be performed while another end-user is transmitting data on the upstream data channel. Thus, the time required for gaining control of the upstream data channel is completely masked by the data transmission time.

BRIEF DESCRIPTION OF THE DRAWINGS

The invention is described with reference to the following drawings wherein like numerals reference like elements, and wherein.

DETAILED DESCRIPTION OF PREFERRED EMBODIMENTS

Figure 1:
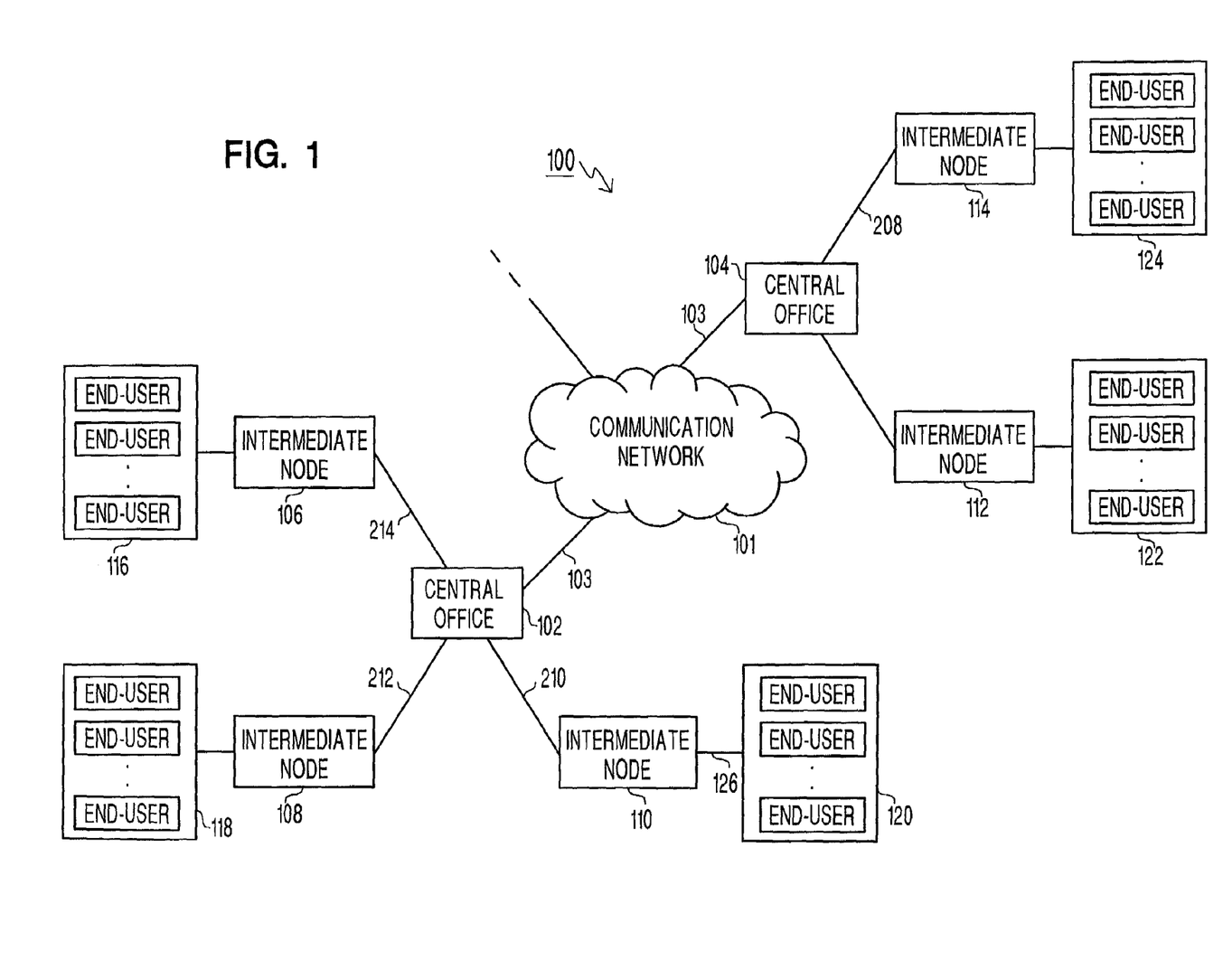
FIG. 1 shows a block diagram of a communication system.

FIG. 1 is a diagram of a communication system 100 that includes a communication network 101, central offices 102 and 104, and intermediate nodes 106–114. The intermediate nodes 106, 108 and 110 are connected to the central office 102 and the intermediate nodes 112 and 114 are connected to the central office 104. End-user groups 116–124 are coupled to each of the intermediate nodes 106–114, respectively. The connections between the intermediate nodes 106–114 and the central offices 102, 104 are through signal buses 208–214, and the connections between the central offices 102 and 104 and the communication network 101 are through high speed trunks 103, for example. The communication system 100 may be used for communications required by devices such as telephones, televisions or computers, for example.

The communication network 101 may be implemented using any medium such as wireless, radio, optical fiber, or twisted pair, for example. The intermediate node may be mini-fiber node, fiber node, coaxial amplifier, radio port, optical splitter, for example.

When end-users of end-user group 120 desire to communicate with other end-users of other end-user groups such as end-user group 124, the end-users of the end-user group 120 must arbitrate for the privilege of communicating data through signal bus 126. Conventionally, under centralized arbitration control, arbitration must be concluded before any data is transmitted. However, such a scheme requires dedicated time for arbitration to be added to the time required for transferring the data for every data transfer. Thus, even if only a single end-user desires to transmit data through the signal bus 126, arbitration time must be expended resulting in net data transmission inefficiency. This inefficiency may be avoided by protocols such as carrier sensing multiple access/collision avoidance protocols used by Ethernet, for example. Unfortunately, for these types of protocols, end-users are not guaranteed access to the signal bus 126 because access is based on random competition principles.

In a preferred embodiment, the end-users both arbitrate and transmit data concurrently so that if only a single user is participating in the arbitration, the single user may detect a win condition immediately without further arbitration and the arbitration time is masked by the data transmission time. Thus a serial process of arbitrating first and then transmitting data is avoided. If multiple end-users are arbitrating, the arbitration process eliminates all but one of the end-users for transmission over the signal bus 126.

Figure 2:
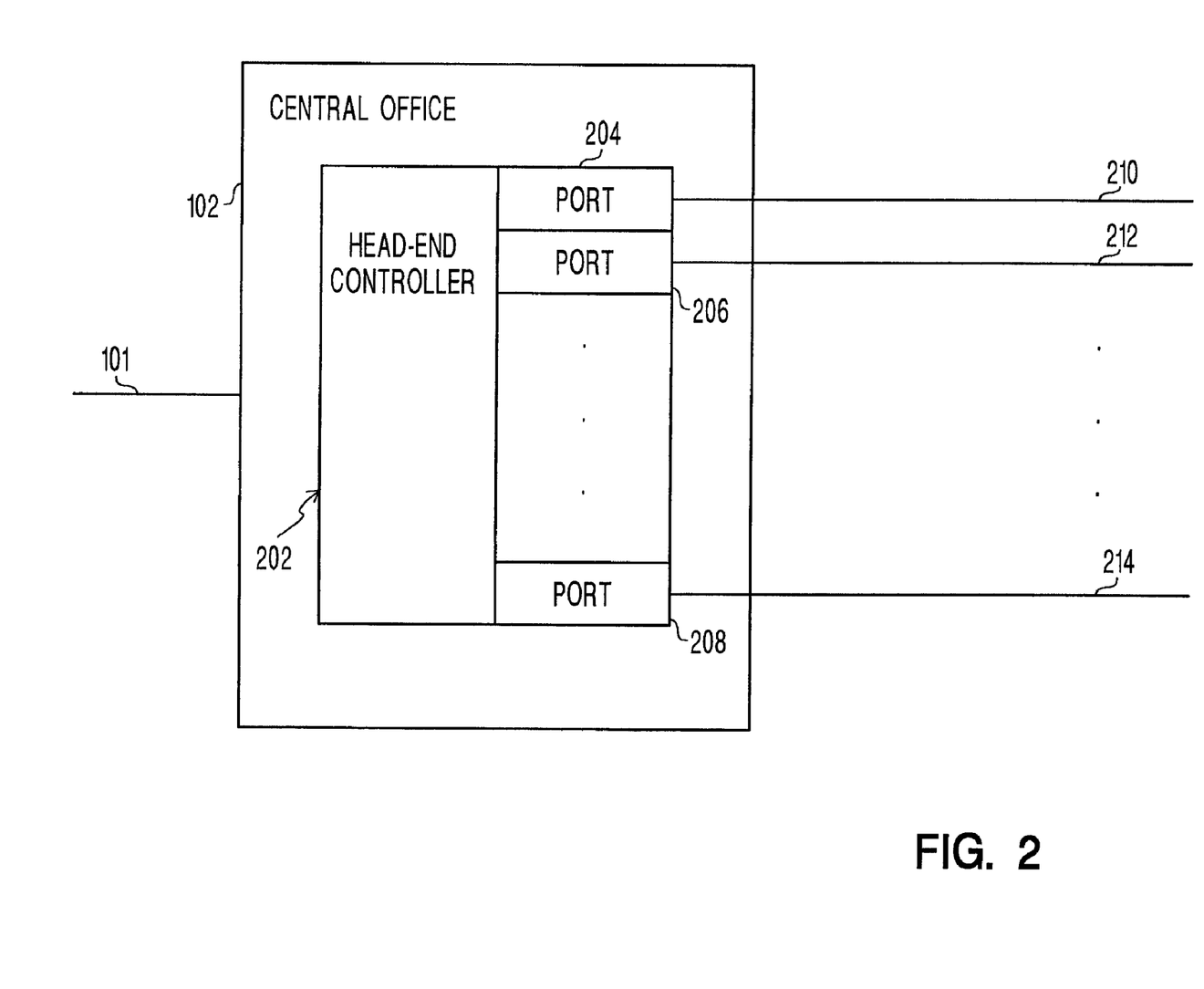
FIG. 2 shows a block diagram of a central office that includes a head-end.

FIG. 2 shows a block diagram of the central office 102 which includes a head-end 202. The head-end 202 includes a head-end controller 203 and a plurality of ports 204, 206 and 208. Each of the ports 204, 206 and 208 are connected to intermediate nodes 110, 108 and 106 through signal buses 210, 212 and 214, respectively. In some instances, the central office 102 may also be the head-end 202.

Figure 3:
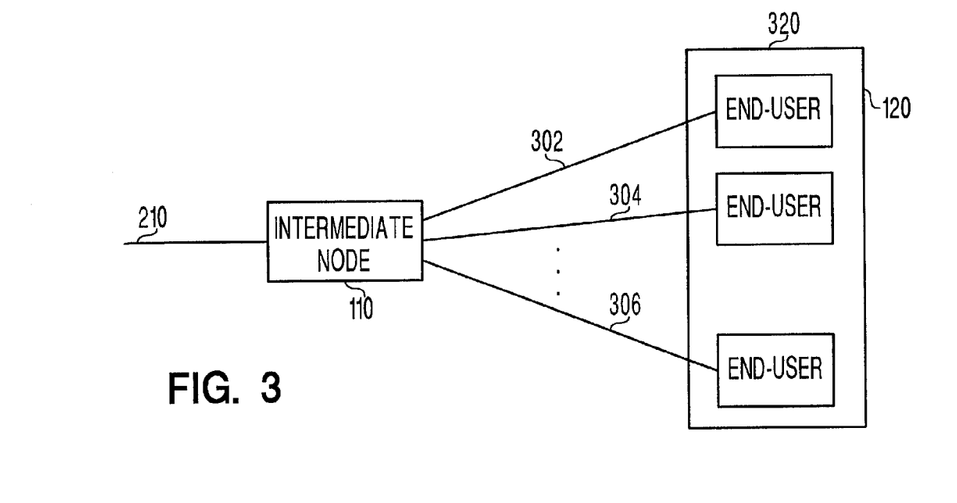
FIGS. 3–4 show possible connection configurations of end-users to an intermediate node.
Figure 4:
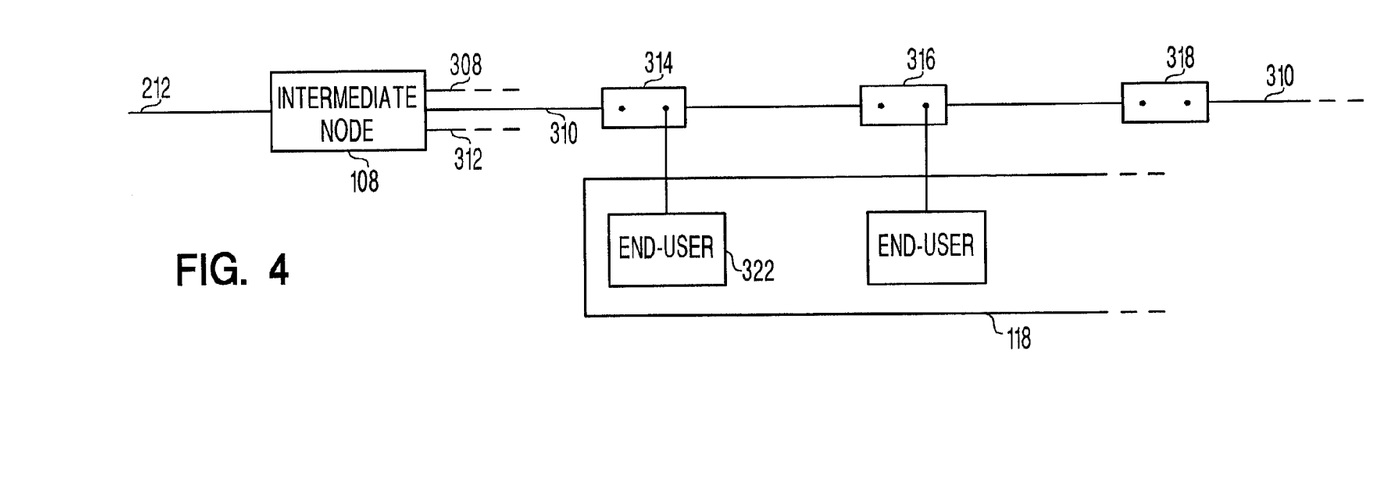

FIGS. 3–4 show examples of how the end-user groups 118 and 120 may be coupled to the intermediate nodes 108 and 110, respectively. In FIG. 3, the end-users 320 of the end-user group 120 are connected to the intermediate node 110 through the signal bus 126 which is in a star configuration having signal buses 302, 304 and 306. In FIG. 4, the end-users 322 of end-user group 118 are connected serially through signal bus 310 where each of the end-users 322 is coupled to the signal bus 310 through taps 314, 316, 318. The intermediate node 108 may also be connected to other end-user groups through additional signal buses 308 and 312. The signal buses 302–312 may be physically implemented by any available medium such as optical fiber, coax or wireless.

Figure 5:
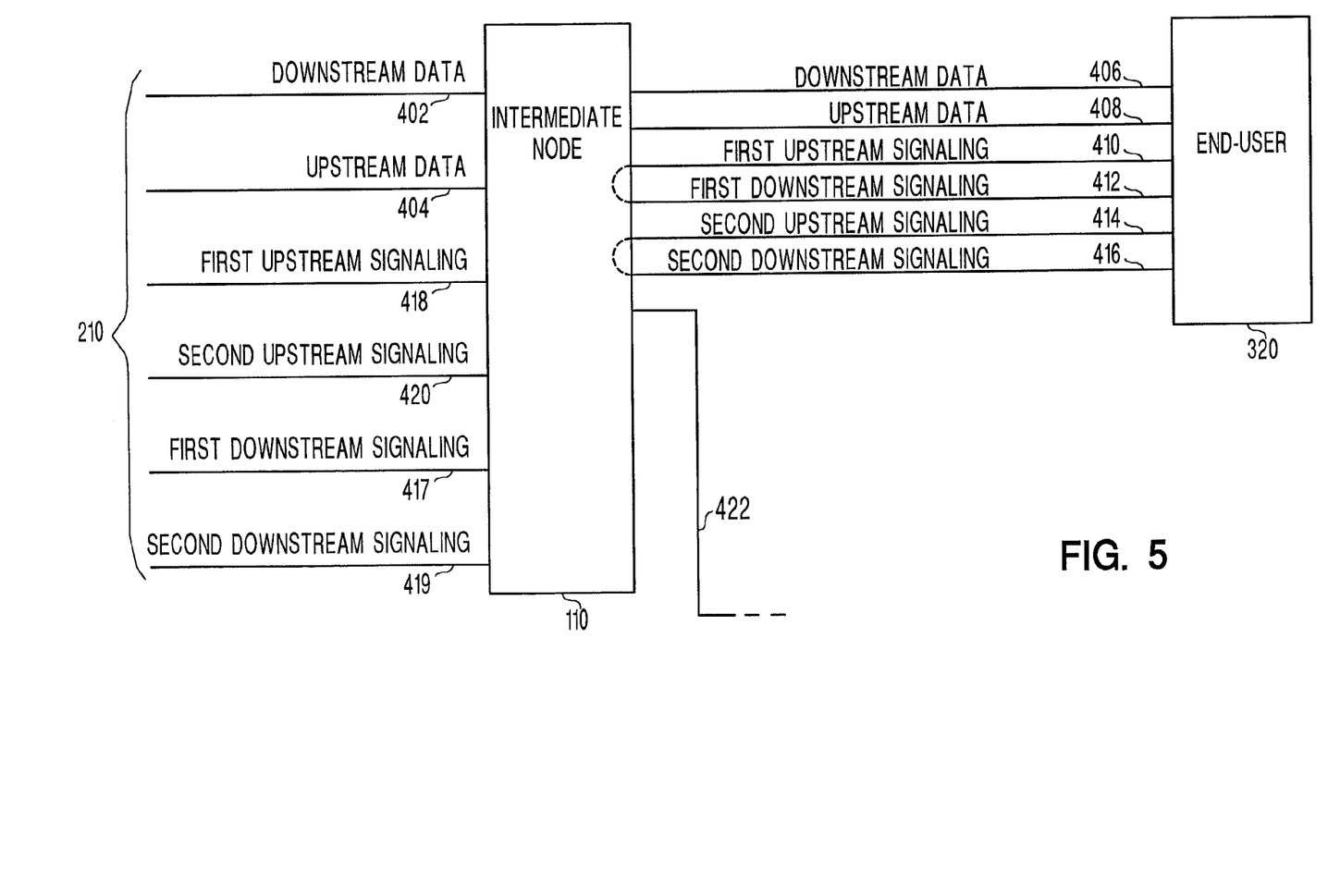
FIG. 5 shows a block diagram of communication channels between a port of the head-end and an intermediate node and between the intermediate node and an end-user.

FIG. 5 shows the signal bus 210 and the signal bus 302 in greater detail. The signal buses 212 and 310 have similar structure as the signal buses 210 and 302, respectively. Thus, a detailed description of signal buses 210 and 302 is exemplary of the structure and functions performed in any of the signal buses 210–214 and 302–312.

In FIG. 5, the port 204 is coupled to the intermediate node 110 through the signal bus 210 which has: (1) a downstream data channel 402; (2) an upstream data channel 404; (3) a first upstream signaling channel 418; (4) a second upstream signaling channel 420; (5) a first downstream signaling channel 417; and (6) a second downstream signaling channel 419. The first and second upstream signaling channels 418 and 420 and downstream signaling channels 417 and 419 are optional and are included for completeness. The intermediate node 110 is coupled to the end-user 320 through the signal bus 302 which includes: (1) a downstream data channel 406; (2) an upstream data channel 408; (3) a first upstream signaling channel 410; (4) a first downstream signaling channel 412; (5) a second upstream signaling channel 414; and (6) a second downstream signaling channel 416.

The head-end 202 transmits information to the end-user 320 through the downstream data channel 402, the intermediate node 110, and the downstream data channel 406. The end-user 320 transmits information to the head-end 202 through the upstream data channel 408, the intermediate node 110, and the upstream data channel 404. The intermediate node 110 may not perform any functions between the (downstream data channel 402, the upstream data channel 404) and (the downstream data channel 406, the upstream data channel 408), respectively. In a preferred embodiment, the signals in the downstream data channel 402 are transferred directly to the downstream data channel 406 and the signals in the upstream data channel 408 are transferred directly to the upstream data channel 404.

The first and second upstream signaling channels 418 and 420 may not be required for allocating the upstream data channel 408 among the end-users 320 because the head-end 202 is not involved in the detailed allocation process. However, the head-end 202 may extract information from the first and second upstream signaling channels 418 and 420 for other purposes such as ensuring security of the communication system.

For example, if hackers pirated the upstream data channel 408, the head-end 202 may compare information such as end-user address from the first and second upstream signaling channels 418 and 420 with address information on the upstream data channel 408. If a mismatch is discovered, then the data transmitted on the upstream data channel 408 may be either discarded or saved for security analysis. Thus, providing the first and second upstream signaling channel to the head-end may improve the security of the communication system. The first and second downstream signaling channels 417 and 419 may be used for system management purposes by the head-end 202. The first and second upstream and downstream signaling channels 410–420 may be implemented using any type of channel architecture such as RF frequency, optical wavelength, time slot, or physical wire, for example.

In the star configuration, the intermediate node 110 may return the signals of the combined first and second upstream signaling channels 410 and 414 from all the end users 320 through the first and second downstream channels 412 and 416 to each of the end-users 320. The intermediate node 110 may also return the signals of each of the first and second upstream signaling channels 410 and 414 separately through the first and second downstream channels 412 and 416, respectively.

The intermediate node 110 may generate other information sufficient to support arbitration. For example, the intermediate node 110 may return only a busy signal indicating that the upstream signaling channels 410 and 414 are busy. For the remaining discussion, it is assumed that the first and second downstream signaling channels 412 and 416 return combined signals of the first and second upstream signaling channels 410 and 414, respectively.

When the end-users 320 are connected serially through signal bus 310, for example, the downstream signaling channels 412 and 416 may not be necessary because each of the end-users 322 may detect the signals transmitted by other end-users 322 on the first and second upstream signaling channels 410 and 414. However, if required due to implementation details, the intermediate node 110 may also loop-back the signals of the first and second upstream signaling channels 410 and 414 or generate a signal that indicates that a collision had occurred to indicate channel status (idle, busy, or collision) to the end-users 322 through the downstream signaling channels 412 and 416.

When data is to be transmitted through the upstream data channel 408, an end-user 320 uses the first and second upstream signaling channels 410 and 414 to gain control of or bid for the upstream data channel 408. In a preferred embodiment, the end-user 320 concurrently transmits auction data on the first upstream signaling channel 410 and address data on the second upstream signaling channel 414. After transmitting the above auction and address data, the end-user 320 receives data from the first and second downstream signaling channels 412 and 416. If the data received from the first downstream signaling channel 412 does not match the corresponding bit that was transmitted, then the end-user 320 has lost the bid for the upstream data channel 408. In this case, the end-user 320 backs off from the first and second upstream signaling channel 410 and 414 and waits until these channels are quiet before bidding again for the upstream data channel 408.

If the data received from the second downstream signaling channel 416 matches the corresponding bits transmitted, then the end-user has won the bid for the upstream data channel 408. If the data received from the first downstream signaling channel 412 matches the corresponding transmitted bit but the data received from the second downstream signaling channel 416 does not match the corresponding transmitted bits, then the end-user 320 is in competition with other end-users and must continue bidding to gain control of the upstream data channel 408. The above described logic is shown in the Table I below.

TABLE I

| First upstream signaling channel | no match | don't care | match |
|---|---|---|---|
| Second upstream signaling channel | don't care | match | no match |
| Bidding result | lost | won | keep bidding |

As shown in FIG. 3, the end-users 320 are separated from the intermediate node 110 by some distance. Thus, time is required for the signals transmitted by the end-user 320 on the first and second upstream signaling channels 410 and 414 to propagate from the end-user 320 to the intermediate node 110 and then back downstream through the first and second downstream signaling channels 412 and 416 to all the end-users 320. This propagation time may be different for different communication mediums and intermediate nodes 110. For the examples discussed below, a round-trip propagation delay of 4 μs through the communication medium is assumed.

Figure 6:
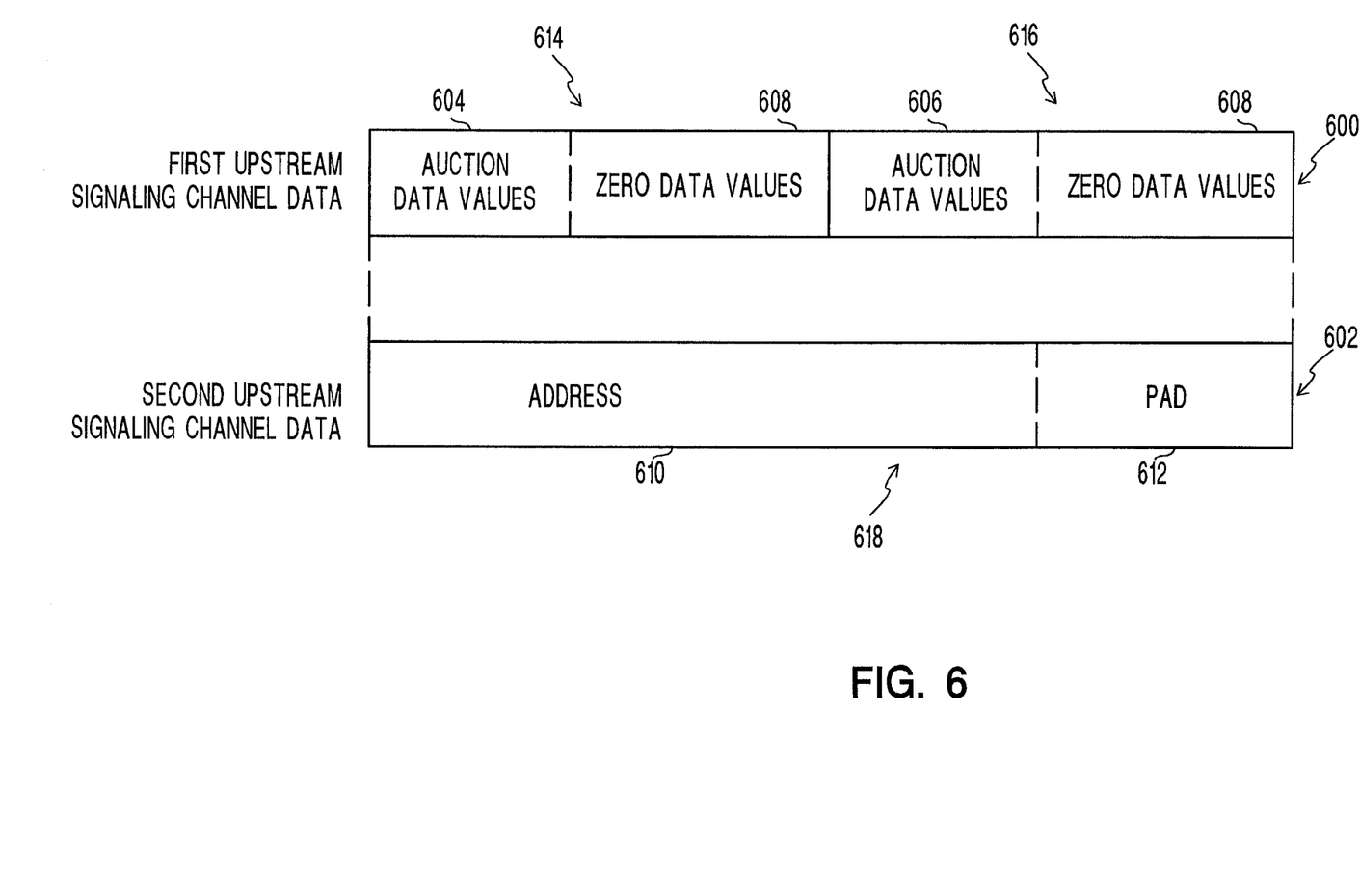
FIG. 6 shows a block diagram of a first upstream signaling channel data and a second upstream signaling channel data.

FIG. 6 shows a block diagram of auction data 600 and address data 602 transmitted on the first and second upstream signaling channels 410 and 414, respectively. The auction data 600 and the address data 602 are transmitted in cycles. For example, first and second auction cycles 614 and 616 may correspond to a single address cycle 618, as shown in FIG. 6. The auction and the address cycles 614–618 are related to the propagation delay times of a communication medium. For example, if the round-trip propagation delay through the communication medium is about 4 μs and each of the address data bits 610 have 1 μs durations, then each of auction data values 604 and 606 have 2 μs durations, and the number of zero values 608 are adjusted so that the round-trip delay time for the auction data values 604 and 606 may be accounted for within the first and second auction cycles 614 and 616.

For example, if the two auction data values 604 and 606 are used where each auction data value has a 2 μs duration, then the maximum round-trip time for an auction data value to be received from the first downstream signaling channel 412 would be 6 μs. Thus, two zero values 608 (2 μs per zero value) are used to pad the auction data values 604 and 606 so that the auction data values 604 and 606 may be received within the respective auction cycles 614 and 616.

If the address data contain one byte or 8 bits of address bits 610 and each address bit has a duration of 1 μs, then the time required for all the address bits 610 would be 8 μs. Thus, in order to allow the end-users 320 to occupy the second upstream signaling channel 414 until the transmitted address is returned and to match the address cycle with an integer multiple of the auction cycles 614 and 616, the address data is padded with four pad bits 612 so that the total address data corresponds to 12 bits and requires 12 μs. Because each auction cycle 614 and 616 requires only 6 μs, 2 auction cycles 614 and 616 may be transmitted for a single address cycle 618.

Figure 7:
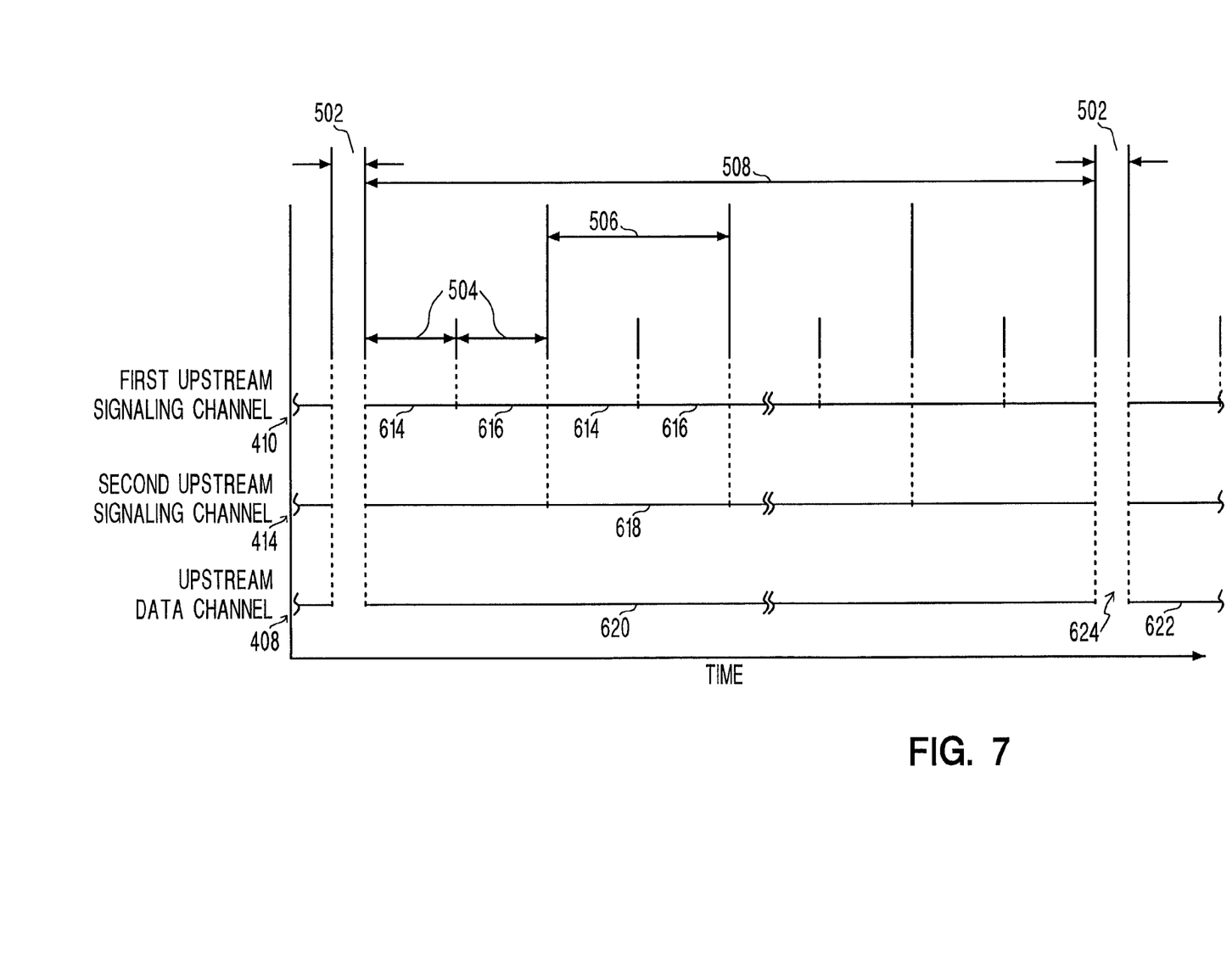
FIG. 7 shows a timing relationship diagram among the communication channels.

FIG. 7 shows the relationships among the cycles of the first and second upstream signaling channels 410 and 414 and the upstream data channel 408. As discussed earlier, two first upstream signaling channel cycles (first and second auction cycle) 614 and 616 correspond to a single second upstream signaling channel cycle (address cycle) 618. Thus, the cycle times for the second upstream signaling channel 506 is twice the cycle time for the first upstream signaling channels 504.

The upstream data channel 408 may also have a cycle 620 and cycle time 508. If, for example, the upstream data channel cycle time 508 is about 51.2 μs, then 4 address cycles 618 may fit within a single upstream data channel cycle 620. As shown in FIG. 7, a gap 624 separates two consecutive upstream data channel cycles 620 and 622. This gap is normally there to ensure that the upstream data channel 408 quiets down before transmission of another cycle. For example, the gap may have a time 502 of 9.6 μs.

While FIG. 7 shows the first and second upstream signaling channel cycles 614–618 and the upstream data channel cycles 620, 622 being idealized and aligned on definite boundaries, actual beginning and ending times of the cycle boundaries may vary depending on the actual implementation. However, the relative relationships of the various cycles may be as shown in FIG. 7. The actual values presented above are examples and may vary depending on implementation and the actual communication medium.

In an exemplary preferred embodiment, when end-users 320 desire to transmit data, each of the end-users 320 bid for control of the upstream data channel 408 by transmitting the data of the first auction cycle 614 and the address data 602 on the first and second upstream signaling channels 410 and 414, respectively. Toward the end of the first auction cycle 614, each of the end-users 320 determines whether its respective bid of the first auction data value 604 was successful by listening to the first downstream signaling channel 412. If unsuccessful because the received auction data values from the first downstream channel 412 do not match the corresponding transmitted auction data values 604, the losing end-users 320 back off from the first and second upstream signaling channels 410 and 412 until the first upstream signaling channel 410 becomes quiet (i.e., the current round of auctioning has ended and certain bidding end-users 320 have been selected). Otherwise, the end-user 320 transmits the second auction data value 606 of the second auction cycle 616 and transmits the remaining bits of the address data 602.

For example, if a "0" auction data value corresponds to a low amplitude signal transmitted on the first upstream signaling channel 410 and a "1" auction data value corresponds to a high amplitude signal transmitted on the first upstream signaling channel 410, then an end-user 320 that transmitted a 0 for the first auction data value 604 and has received a 0 from the first downstream signaling channel 412 has won the bidding on the first upstream signaling channel 410. If a 1 was received, then the bid is lost and the end-user 320 backs off from the first and second upstream signaling channels 410 and 414 and refrains from bidding until the first upstream signaling channel 410 is quiet. The first upstream signaling channel 410 is quiet if neither a 0 nor a 1 auction data value is being transmitted (e.g., no carrier signal).

If the first auction cycle 614 was successful, the end-user 320 may begin transmitting the second auction data value on the first upstream signaling channel 410. If the end-user 320 transmits a 1 for the second auction data value 606 and receives a 1 from the first downstream signaling channel 414, then the end-user 320 has won the second auction cycle 616. If the end-user 320 has received the same address bits from the second downstream signaling channel 416 that were transmitted, then the end-user 320 has won the bid for the upstream data channel 408. If the end-user 320 wins the auction on the first upstream signaling channel 410 but does not receive the same address bit as was transmitted on the second upstream signaling channel 414, then the end-user 320 must continue bidding to gain control of the upstream data channel 408 because more than one address was transmitted (i.e., more than one end-user 320 were bidding).

The auction data values may be used to allocate priority as well as to provide arbitration among the end-users 320. For example, Table II below shows how two auction data values may be used to define four priority levels with 00 being the lowest priority and 11 being the highest priority. Each of the end-users 320 is assigned one of the priority levels. Thus, during the first two auction cycles 614 and 616, each of the bidding end-users 320 outputs its respective priority auction data values so that only the highest priority end-users 320 are selected. For the subsequent auction cycles, the remaining end-users 320 may generate random auction data values so that end-users of the same priority level may arbitrate for control of the upstream data channel 408.

TABLE II

Auction Data Values

| | |
|---|---|
| 11 | Highest priority |
| 10 | ↑ |
| 01 | \| |
| 00 | Lowest priority |

When an end-user 320 loses a bid, a scheme may be implemented where the end-user 320 may increase the priority level for the later rounds of bidding. For example, if the data to be transmitted by an end-user 320 has a timing requirement where the data must be transmitted before a certain time, the end-user may determine the priority of the auction data values based on the time remaining to transmit the data. Thus, the end-user 320 may choose auction data values of 00 for the first several bids, for example, but as the time remaining for transmitting the data approaches zero (or a minimum time required for transmitting the data), the end-user 320 may increase the priority level so that the data transmission may be ensured to occur within the required time. If a larger number of priority levels are required, more auction data values 604 and 606 may be used to set the priority levels so that efficient data transmission may be achieved for both low and high priority data transmissions.

After the auction cycles 614, 616 determining the priority, the successful bidding end-users 320 may generate random auction data values for subsequent auction cycles 614, 616 to bid for control of the upstream data channel 408. During all the auction cycles 614, 616, more than one end-user 320 may transmit the same sequence of auction data values 604 and 606. In this case, the address data transmitted on the second upstream signaling channel 414 is used to indicate whether an end-user 320 is the only end-user bidding for the upstream data channel 408. Because the address data is transmitted on the second upstream signaling channel 414 at the same time as the auction data values 604 and 606 on the first upstream signaling channel 410, each of the end-users 320 determine whether there are more than one end-user 320 bidding for control of the upstream data channel 408 by detecting whether their respective addresses are returned on the second downstream signaling channel 416. If the address received from the second downstream signaling channel 416 does not match the end-user address, the end-user 320 must bid for control of the upstream data channel 408 again during the next auction cycle 614, 616.

The end-users 320 may begin transmitting data on the upstream data channel 408 at the same time as the address data is transmitted on the second upstream signaling channel 414 or may treat the upstream data channel 408 cycle as frames and transmitting the data during a following frame of the upstream data channel 408. If the data is transmitted on the upstream data channel 408 at the same time as the auction and the address data are transmitted on the second upstream signaling channel 414, each of the end-users 320 stops the data transmission as soon as it is determined that the bidding is lost or that there are more than one end-user bidding for control of the upstream data channel 408. Thus, at the end of each of the address cycles 618, each of the end-users 320 determines whether the bid was successful and whether to continue transmitting data on the upstream data channel 408 or to stop transmitting or retransmitting data on the upstream data channel 408.

Once an end-user 320 takes control of the upstream data channel 408, the control is maintained until all the data is transmitted using as many upstream data channel cycles or frames as required or until a system maximum is reached. If the data is transmitted during the bidding process, the winning end-user 320 blocks all other end-users 320 from bidding on the first and second upstream signaling channels 410 and 414 by constantly transmitting a carrier signal, for example, so that the first and second upstream signaling channels 410 and 414 are never quiet until data transmission is completed. All the other end-users 320 monitor the first and second downstream signaling channels 412 and 416 until these channels become quiet before bidding for control of the upstream data channel 408.

If the end-users 320 transmit data on the upstream data channel 408 by frames, each of the upstream data channel cycles 620 is treated as a single frame. For this embodiment, the end-users 320 bid for control of a future frame of the upstream data channel 408 using the first and second upstream signaling channels 410 and 414. All the end-users 320 keep a count of the number of end-users 320 that had won the bidding process. In this way, the first and second upstream signaling channels 410 and 414 may be continually used to determine the "next" end-user 320 that has control of the upstream data channel 408 independent of the process proceeding on the upstream data channel 408. As each of the winning end-users 320 transmit their data on the upstream data channel 408, all the end-users 320 monitor the number of remaining winning end-users 320 that are waiting to transmit on the upstream data channel 408. Thus, when an end-user 320 wins the bidding process, the end-user 320 can determine exactly when to transmit its data on the upstream data channel 408.

When transmitting data on the upstream data channel 408 in frames, the current end-user 320 that is transmitting data continues to transmit data until the data transmission is complete (or until a system maximum is reached, for example). When the data transmission is completed, the end-user 320 may transmit a data complete signal to indicate to other end-users 320 that the upstream data channel 408 will be available for a next end-user 320 to transmit data. The end-user 320 may transmit the data complete signal in several ways. For example, the data complete signal may be transmitted during the gap 624 in any of the channels 406–416. All the remaining winning end-users 320 monitor the gap 624 to detect when the current data transmission using the upstream data channel 408 has ended.

Alternatively, the end-user 320 may transmit a predetermined reserved pattern such as "11111111" on either the first or second or both upstream signaling channels 410 and 414 (i.e., force the upstream signaling channels 410 and 414 to be high). Thus, when the end-user 320 transmits this reserved pattern, all other auction data values and/or address bits will be preempted. Thus, the reserved pattern may unambiguously indicate a data complete condition that is detectable by all end-users 320. When the data complete signal is transmitted, the next winning end-user 320 may begin data transmission starting with the next frame of the upstream data channel 408.

Figure 8:
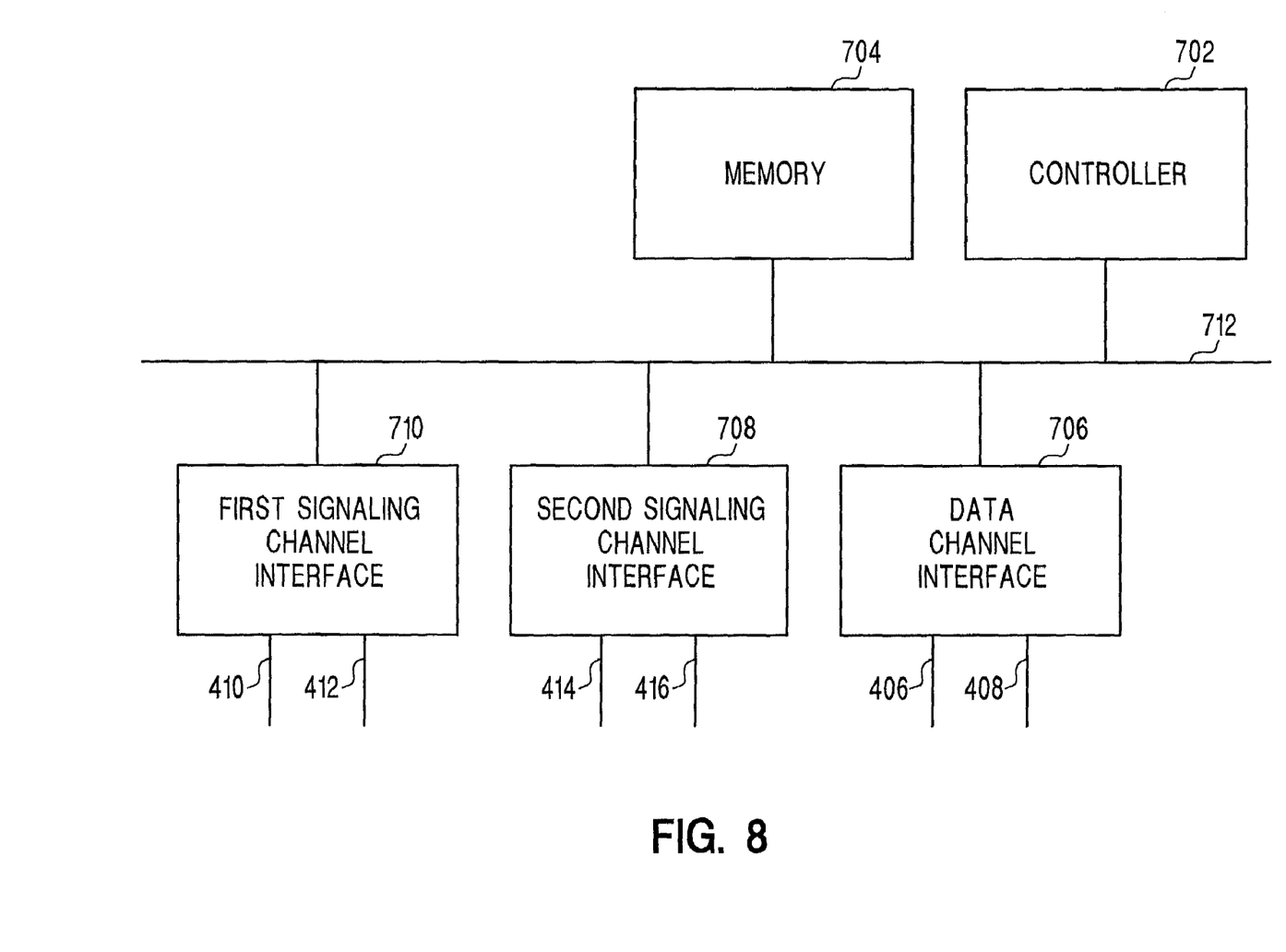
FIG. 8 shows a block diagram of an end-user.

FIG. 8 shows a block diagram of an end-user 320. The end-user 320 includes a controller 702, a memory 704, a data channel interface 706, a first signaling channel interface 710 and a second signaling channel interface 708. The above components are coupled together via signal bus 712.

When the end-user 320 desires to transmit data, the controller 702 retrieves the auction data values 604 and 606 corresponding to an assigned priority from the memory 704, formats the auction data 600, and outputs the auction data 600 through the first signaling channel interface 710. The controller 702 also retrieves the end-user 320 address from the memory 704, formats the address data 602, and outputs the address through the second signaling channel interface 708. If the data is transmitted simultaneously with the address, the controller 702 also outputs the data through the data channel interface 706 during the appropriate time.

If the data is to be transmitted on a frame basis, the controller 702 maintains in the memory 704 a number of remaining end-users 320 that are waiting to transmit their data. If one of the end-users 320 wins a bid, the controller 702 saves the remaining number of end-users 320 waiting to transmit data and determines when to transmit the data on the upstream data channel 408 based on this number.

The controller 702 may also receive data from the head-end 202 through the downstream data channel 406 and the data channel interface 706. The head-end 202 (or the central office 102) may send control data to allocate priorities, for example. If, based on system considerations, the head-end 202 determines that the priority of a particular end-user 320 should be increased from 00 to 10, for example, the head-end 202 transmits control signals to the end-user 320 to change the priority level from 00 to 10.

Figure 9:
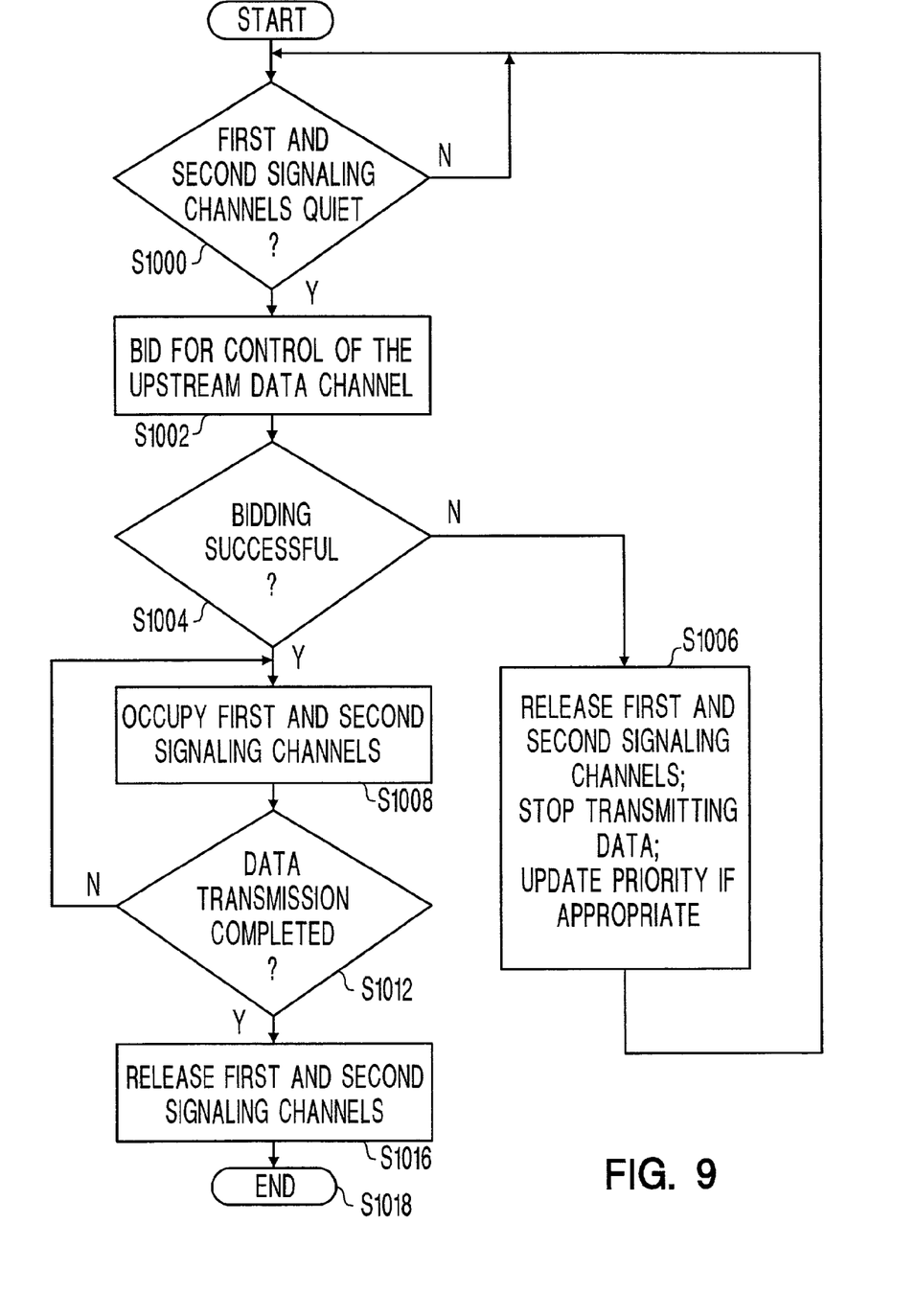
FIG. 9 shows a flow chart of an end-user process to transmit data concurrently with arbitration.

FIG. 9 shows a flow chart for the end-user 320 where the data is transmitted on the upstream data channel 408 at the same time as the address data on the second upstream signaling channel 414. In step 1000, the controller 702 determines whether the first and second upstream signaling channels 410 and 414 are quiet. If quiet, the controller 702 goes to step 1002; otherwise, the controller 702 returns to step 1000. In step 1002, the controller 702 transmits the auction data 600 and the address data 602 on the first and second upstream signaling channels 410 and 414, respectively, transmits the data on the upstream data channel 408, and goes to step 1004. In step 1004, the controller 702 determines whether the bidding was successful. If successful, the controller 702 goes to step 1008; otherwise, the controller goes to step 1006. In step 1006, the controller 702 releases the first and the second upstream signaling channels, stops transmitting data, updates the auction priority, if appropriate, and returns to step 1000.

In step 1008, the controller 702 occupies the first and second upstream signaling channels 410 and 414 by transmitting a carrier, for example, and goes to step 1012. In step 1012, the controller 702 determines whether the data transmission has completed. If completed, the controller 702 goes to step 1016; otherwise, the controller returns to step 1008. In step 1016, the controller 702 releases the first and second signaling channels and goes to step 1018 and ends the process.

Figure 10:
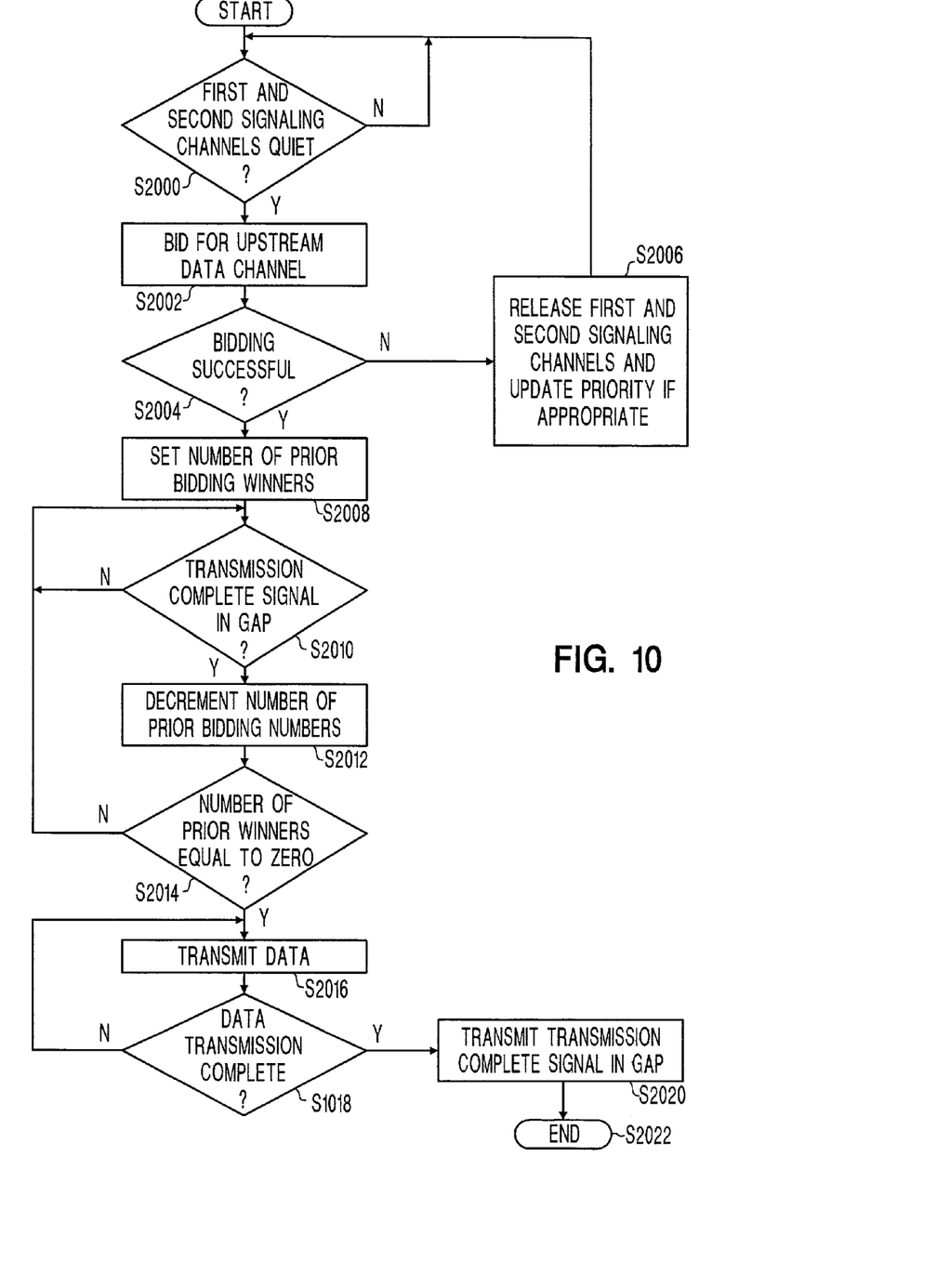
FIG. 10 shows a flow chart of an end-user process to transmit data in an upstream data channel frame after successful arbitration.

FIG. 10 shows a flow chart of an end-user process for transmitting data on a frame basis. In step 2000, the controller 702 determines whether the first and second upstream signaling channels are quiet. If quiet, the controller 702 goes to step 2002; otherwise, the controller 702 returns to step 2000. In step 2002, the controller 702 transmits the auction and address data 600 and 602 on the first and second upstream signaling channels 410 and 414, respectively, and goes to step 2004. In step 2004, the controller determines whether the bidding was successful. If successful, the controller 702 goes to step 2008; otherwise, the controller goes to step 2006. In step 2006, the controller 702 releases the first and second upstream signaling channels and updates the auction priority, if appropriate, and returns to step 2000.

In step 2008, the controller 702 sets the number of prior bidding winners and goes to step 2010. In step 2010, the controller 702 determines whether a transmission complete signal was transmitted in the gap 624 (which is optional). If transmitted, the controller 702 goes to step 2012; otherwise, the controller 702 returns to step 2010. In step 2012, the controller 702 decrements the number of prior bidding winners and goes to step 2014. In step 2014, the controller 702 determines whether the number of prior bidding winners is equal to zero. If equal to zero, the controller 702 goes to step 2016; otherwise, the controller 702 returns to step 2010.

In step 2016, the controller 702 transmits the data on the upstream data channel 408 and goes to step 2018. In step 2018, the controller 702 determines whether the data transmission has completed. If completed, the controller 702 goes to step 2020; otherwise, the controller 702 returns to step 2016. In step 2020, the controller 702 transmits the transmission complete signal in the gap 624 (which is optional) and goes to step 2022 and ends the process.

Figure 11:
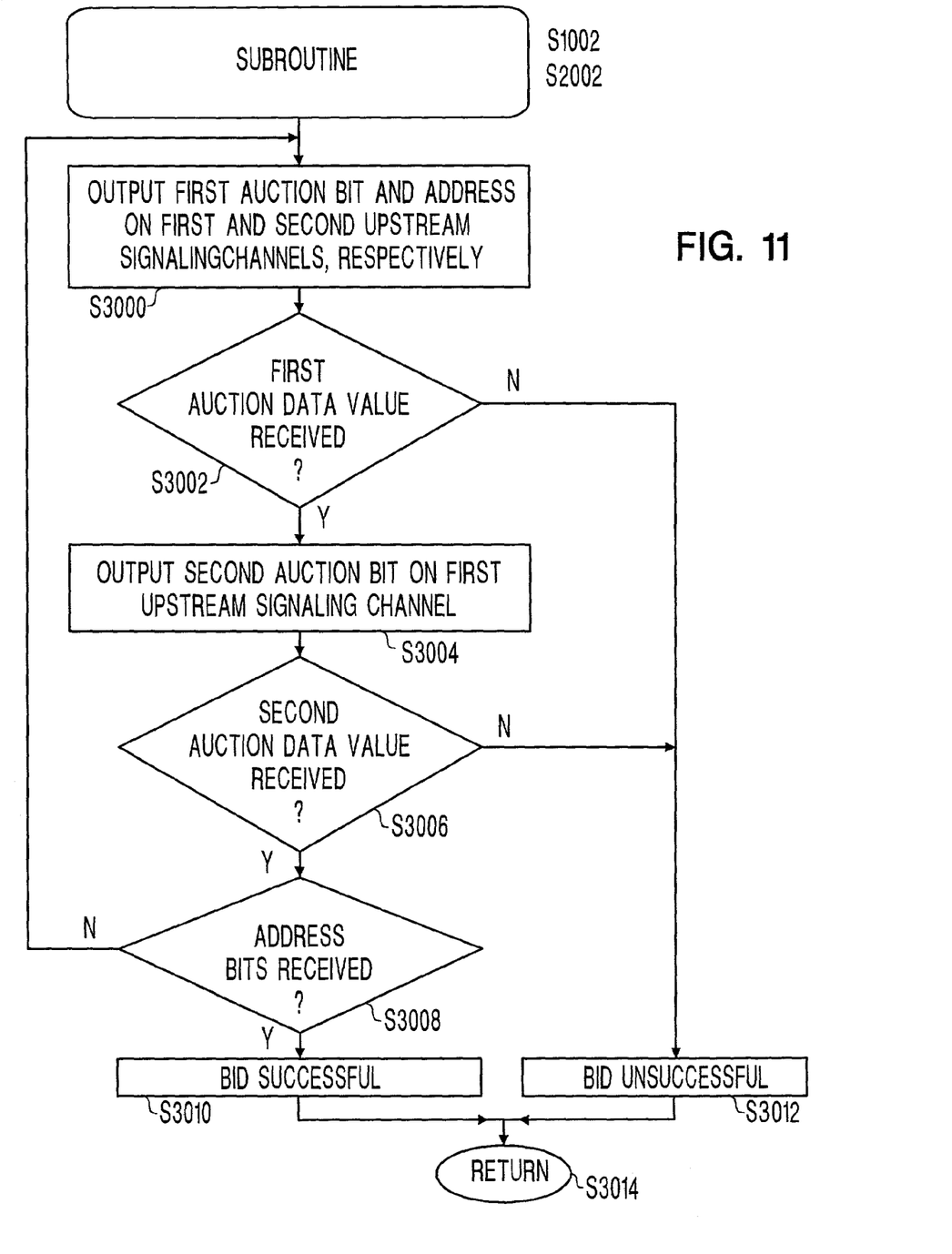
FIG. 11 shows a flow chart of a bidding process.

FIG. 11 shows step 1002 and step 2002 of FIGS. 9 and 11, respectively, in greater detail. In step 3000 the controller 702 outputs the first auction data value 604, the zero data values 608, the address bits 610 and address pad bits 612 on the first and second upstream signaling channels 410 and 414, respectively, and goes to step 3002. In step 3002, the controller 702 compares the signals received from the first downstream signaling channel 412 and determines whether the received signal matches the first auction data value transmitted in step 3000. If the received first auction data value matches the transmitted first auction data value 604, the controller 702 goes to step 3004; otherwise, the controller 702 goes to step 3012.

In step 3004, the controller 702 outputs the second auction data value 606, and the zero data values 608 on the first upstream signaling channel 410 and goes to step 3006.

In step 3006, the controller 702 receives the signal from the first downstream signaling channel 412 and determines whether the received signal matches the second auction data value 608 transmitted in step 3004. If a match is found, the controller 702 goes to step 3008; otherwise, the controller 702 goes to step 3012. In step 3012, the controller 702 determines that the bid is unsuccessful and goes to step 3014 and returns to the calling step.

In step 3008, the controller 702 determines whether the signals received from the second downstream signaling channel 416 matches the address bits transmitted in step 3000. If the received signals match the transmitted address bits, the controller 702 goes to step 3010; otherwise, the controller 702 returns to step 3000. In step 3010, the controller 702 determines that the bid for the upstream data channel 408 is successful and goes to step 3014 to return to the calling step.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for allocating a communication medium among a plurality of end-users, comprising:

bidding concurrently on both a first signaling channel and a second signaling channel without the use of a central arbitration device to select one of the end-users to transmit data through the communication medium; and transmitting selected end-user data on the communication medium, the selected end-user data capable of being transmitted concurrently while the bidding process occurs, wherein bidding end-users transmit end-user data on the communication medium while bidding on the first and the second signaling channels, a bidding end-user backing off from the communication medium if the bidding end-user is not selected, the bidding end-user transmitting the end-user data on the communication medium if the bidding end-user is selected.

2. The method of claim 1, wherein an end-user transmitting end-user data on the communication medium prevents other end-users from bidding on at least one of the first signaling and the second signaling channels while the end-user is transmitting the end-user data.

3. A system for allocating a communication medium, comprising:

a first signaling channel;

a second signaling channel; and a plurality of end-users coupled to the first and the second signaling channels, the end-users bidding on both the first and the second signaling channels concurrently without the use of a central arbitration device to select one of the end-users to transmit data through the communication medium, a selected bidding end-user of the end-users transmitting data on the communication medium, and the selected end-user data capable of being transmitted concurrently while the bidding process occurs, wherein the bidding end-users transmit end-user data on the communication medium while bidding on the first and the second signaling channels, a bidding end-user backing off from the communication medium if the biding end-user is not selected, the bidding end-user transmitting the end-user data if the bidding end-user is selected.

4. The system of claim 3, wherein an end-user transmitting end-user data on the communication medium prevents other end-users from bidding on at least one of the first and the second signaling channels while the end-user is transmitting the end-user data.

* * * * *